(12) United States Patent
Musalem et al.

(10) Patent No.: US 6,439,050 B1
(45) Date of Patent: Aug. 27, 2002

(54) COMPENSATED INTEGRATED MICRO-MACHINED YAW RATE SENSOR WITH QUADRATURE SWITCHING

(75) Inventors: Francois-Xavier Musalem, Tessenderlo (BE); William R. Betts, Chasetown (GB); Roger Diels, Erps-Kwerps (BE)

(73) Assignee: Melexis, Tessenderlo (BE)

( * ) Notice: Subject to any disclaimer, the term of this patent is extended or adjusted under 35 U.S.C. 154(b) by 0 days.

(21) Appl. No.: 09/522,667

(22) Filed: Mar. 10, 2000

(51) Int. Cl.$^7$ ................................................. G01P 9/00
(52) U.S. Cl. ................................................. 73/504.12
(58) Field of Search ........................... 73/1.77, 504.02, 73/504.03, 504.04, 504.12

(56) References Cited

U.S. PATENT DOCUMENTS

| | | |
|---|---|---|
| 5,203,208 A | 4/1993 | Bernstein |
| 5,610,234 A | 3/1997 | Fima et al. |
| 5,895,851 A * | 4/1999 | Kano et al. ............... 73/504.04 |
| 5,952,572 A * | 9/1999 | Yamashita et al. ........ 73/504.04 |
| 5,992,233 A | 11/1999 | Clark |
| 6,164,134 A * | 12/2000 | Cargille .................... 73/504.02 |
| 6,230,563 B1 * | 5/2001 | Clark et al. ............... 73/504.04 |

FOREIGN PATENT DOCUMENTS

FR    2 772 469 A1    6/1999

* cited by examiner

Primary Examiner—Richard A. Moller
(74) Attorney, Agent, or Firm—Townsend and Townsend and Crew LLP

(57) ABSTRACT

An integrated circuit combines micro-machined elements, piezoelectric elements and signal processing components as part of a compensated oscillating gyroscopic sensor for angular motion detection. An oscillating mass is supported on a number of flexible beams micro-machined into an integrated circuit device, such as a silicon CMOS device. Several Piezo-electric elements, deposited on the beams, are provided to excite the mass and to measure the accelerations. Integrated in the device are electronic circuitry that initiates and maintains the oscillation and electronic circuitry that detects and measures the subsequent motion. Additional circuitry is also provided to eliminate the effects of quadrature oscillation and to determine the Coriolis acceleration and thus the magnitude of the external perturbing velocity.

15 Claims, 2 Drawing Sheets

COMPENSATED INTEGRATED MICRO-MACHINED YAW RATE SENSOR WITH QUADRATURE SWITCHING

CROSS REFERENCES TO RELATED APPLICATIONS

This application is related to U.S. Non-Provisional patent application Ser. No. 09/523,319, filed concurrently herewith on Mar. 10, 2000, entitled "COMPENSATED INTEGRATED MICRO-MACHINED YAW RATE SENSOR," the disclosure of which is hereby incorporated by reference in its entirety.

BACKGROUND OF THE INVENTION

The present invention relates generally to motion sensing devices, and more particularly to micro-machined gyro sensors for measuring an applied angular velocity.

The advent of micro-machining has opened the way for a re-assessment of older traditional solutions to problems and has created opportunities to create improved implementations of established principles with integrated interface and control electronics in a highly developed system. One example is the implementation of a gyro in an integrated circuit with silicon circuitry.

Gyros have been effectively used in aircraft and other navigational systems with great effect as angular motion sensors, but at high cost. Implementing a gyro in integrated form can lead to a cost reduction which makes their use more feasible in the automotive field for such uses as navigation, stability control, suspension control and general vehicle dynamics management.

Generally, a gyro is a mass that is excited to rotate or oscillate or vibrate in a stable manner. The inertia of the mass resists attempts to disturb the motion. Moving the mass so as to change the relative position of the plane in which it is moving causes a reaction, known as the Coriolis effect, that leads to an acceleration at right angles to the plane of the motion. This acceleration is the result of, and proportional to, the perturbing motion. By measuring the acceleration in the orthogonal direction(s), a value for the perturbing velocity can be determined.

The problems associated with gyros are well understood and at the traditional macro level have generally been addressed and overcome. These solutions however do not have direct equivalents in the micro-machined environment where the cost-benefits of integrated manufacture come from silicon processing techniques developed for high volume processing of integrated circuits. These processing techniques are not suitable for implementing the individual machining requirements or mechanical adjustments needed for micro-machined gyros. The minute mechanical adjustments that are made on parts, which in the macro situation are quite large, would be proportionally small on the micro level and consequently more difficult and costly to implement.

In addition to the basic mechanical problems of producing a balanced mass that can be set up to oscillate or spin to act as a gyro in a micro-machined environment, techniques are needed to supply energy to the mass to excite its motion, and to measure the orthogonal acceleration(s) caused by the perturbing velocity. A major problem also exists where the mass exhibits a tendency to oscillate off-axis, known as quadrature deflection, or to oscillate in more than one mode. A well-known problem exists, for example, where an oscillating mass, in addition to the basic linear motion, oscillates in a twisting or rotational manner. Such unwanted oscillations occur when the mass is not perfectly balanced or aligned. These unwanted oscillations act as if they were externally applied velocities which cause additional Coriolis accelerations that must be detected and separated from the wanted accelerations.

Accordingly, there is a need in the art for a system and method for determined and compensating for the effects of unwanted imbalances in gyros in an efficient, cost-effective manner so as to provide for a more accurate determination of an imposed velocity.

SUMMARY OF THE INVENTION

The present invention provides for such a gyro by embodying in the design additional elements to enable the oscillation of the mass to be set up in either of two or more different modes. The effects of the unwanted imbalances are determined and compensating signals applied to cancel the unwanted effects thus enabling more accurate determination of an imposed velocity.

According to the invention, a gyro sensor includes an oscillating mass supported on a number of flexible beams micro-machined into an integrated circuit device, such as a silicon CMOS device. Several Piezo-electric elements, deposited onto the beams, are provided to excite the mass and to measure the accelerations. Integrated in the device are electronic circuitry that initiates and maintains the oscillation and electronic circuitry that detects and measures the subsequent motion. Additional circuitry is also provided to determine the effects of any quadrature oscillation that may be present due to manufacturing imperfections and to generate signals to drive the oscillating mass in such a manner as to eliminate or reduce such unwanted motion. Eliminating or reducing such unwanted motions facilitates determining the Coriolis acceleration, and thus the magnitude of an external perturbing velocity.

According to an aspect of the invention, a micro-machined gyro sensor capable of measuring an externally imposed velocity is provided which typically comprises a mass coupled to a rigid annular support by a first pair of opposing flexible members and a second pair of opposing flexible members, wherein the first pair of members define a first axis, and wherein the second pair of members define a second axis substantially orthogonal to the first axis. The gyro sensor also typically includes a first pair of driving elements deposited on the first pair of members, a second pair of driving elements deposited on the second pair of members, a first pair of sensing element deposited on the first pair of members, and a second pair of sensing element deposited on the second pair of members. The first sensing elements generate first signals proportional to the oscillation of the mass along the first axis, and the second sensing element generate second signals proportional to the oscillation of the mass along the second axis. The second pair of driving elements on the second pair of members is used to correct any off-axis oscillation along the second axis such as that due to mechanical imperfection. The gyro sensor also typically includes a control circuit coupled to the first and second pairs of driving elements, wherein the control circuit generates a control signal which when applied to the first pair of driving elements causes the mass to oscillate along the first axis, and a detection circuit coupled to the first and second sensing elements, wherein the detection circuit receives the first and second signals and generates an output signal having a component proportional to the imposed angular velocity and a second component proportional to the unwanted off-axis oscillations along the second axis. In one embodiment, a second signal is applied to the second pair of driving elements by the control circuit such as to reduce or eliminate the unwanted oscillations.

According to another aspect of the invention, a micromachined gyro sensor capable of measuring an externally imposed velocity is provided which typically comprises a mass coupled to a rigid annular support by a first pair of opposing flexible members and a second pair of opposing flexible members, wherein the first pair of members define a first axis, and wherein the second pair of members define a second axis substantially orthogonal to the first axis. The gyro sensor also typically includes driving means coupled to the first pair of members for causing the mass to oscillate perpendicular to the plane of the rigid annulus and detection means, coupled to one of the first pair of members and one of the second pair of members, for detecting and comparing oscillations of the mass along the first axis and along the second axis so as to measure the (Coriolis) acceleration caused by the imposed velocity and to determine a signal to be applied to the driving means to reduce or eliminate any off-axis or other unwanted oscillations.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DESCRIPTION OF THE SPECIFIC EMBODIMENTS

Figure 1:
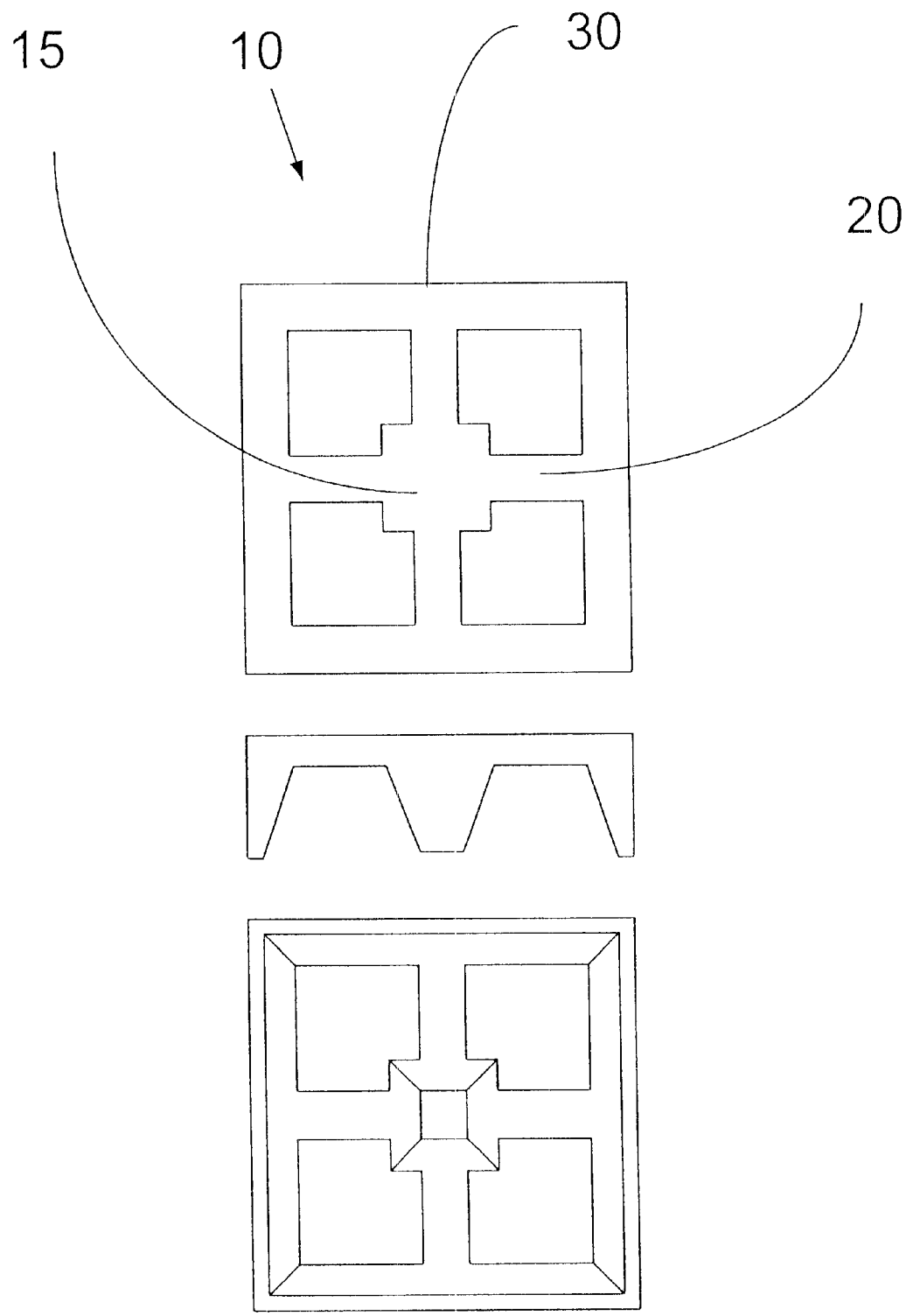
FIG. 1 shows the general arrangement of the micromachined elements according to an embodiment of the present invention.

FIG. 1 shows the general arrangement of the micromachined elements in a central mass device 10 according to an embodiment of the present invention. Central mass device 10 includes a central core 15 connected to an annulus-like rigid support structure 30 ("annulus 30") by a plurality of flexible beams 20. Central core 15 and beams 20 are of sufficient dimension, and are arranged such that when the device is subjected to the anticipated perturbing forces and accelerations, the deflections of the mass of central core 15 does not exceed the flexibility of beams 20. Annulus 30 is mounted such that core 15 and beams 20 are free to move both in and perpendicular to the plane of annulus 30. As shown, annulus 30 is rectangular in shape, however, it may take on any geometry as desired, for example, circular. The desired design dimensions depend upon the materials chosen for the components of central mass device 10 as well as the details of the manufacturing process. The arrangement must be capable of oscillating in the chosen manner while at the same time surviving undamaged any shock or vibration condition to which the device may ultimately be exposed.

Deposited on beams 20 are a plurality of Piezo electric elements. If a Piezo electric element is connected across a voltage source and a voltage is applied thereto, the element exerts a mechanical force which changes the dimension of the Piezo electric element in a direction that is dependent upon the axis of the applied electric field. The force is generally proportional to the magnitude of the applied voltage. In a similar manner, if the Piezo electric element is strained by mechanical movement of the Piezo electric element, an electric field is generated across the Piezo electric element in a direction dependent upon the direction of the applied strain, resulting in a voltage difference across the Piezo electric element. Generally, the generated voltage is proportional to the applied strain.

Figure 2:
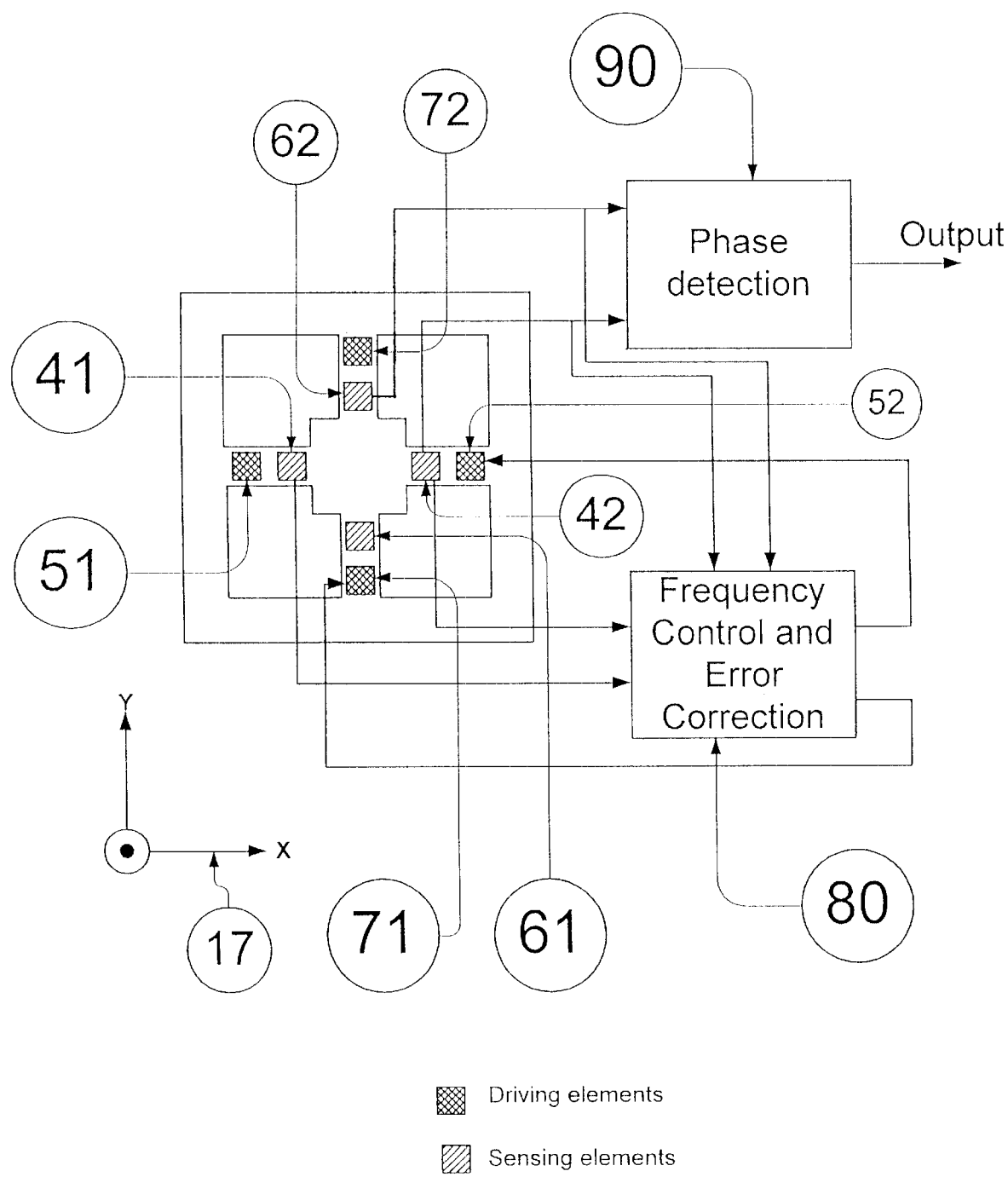
FIG. 2 shows the arrangement of Piezo electric elements and their connections implemented in the device of FIG. 1 according to an embodiment of the present invention.

A preferred arrangement of Piezo electric elements implemented in the device of FIG. 1 is shown in FIG. 2. Rectangular central core 15 is supported on four beams 20 arranged orthogonally, one on each side of the core. Two separate pairs of Piezo electric elements, first (sensing) pair 41 and 42 and second (driving) pair 51 and 52, are coupled to each of a first pair of opposite beams, and two further separate pairs of Piezo electric elements, third (sensing) pair 61 and 62 and fourth (driving) pair 71 and 72, are coupled to each of a second pair of opposite beams as shown. In a preferred embodiment, all piezo electric elements are deposited on the beams using silicon processing techniques as are known.

Control circuitry 80 is provided to generate an alternating voltage signal. Control circuitry 80 is connected to the second Piezo electric element pair 51 and 52 on each beam of the first pair of opposite beams. The connections are such that the signal generated by control circuitry 80 when applied to the Piezo electric element 51 in one beam causes element 51 to increase its length measured along the direction of the beam from annulus 30 to core 15, and the signal when applied to the second Piezo electric element 52 in the opposite beam causes element 52 to decrease its length in the same relative direction. In this manner, the alternating voltage signal applied by control circuitry 80 causes the Piezo electric elements 51 and 52 to drive the first pair of opposing beams so as to set up a mechanical oscillation of the core (mass). The mechanical oscillation is along the axis defined as the X-axis 17, determined by the first pair of opposing beams. The mechanical oscillation has a frequency dependent upon the frequency of the applied alternating voltage. One or both of the first pair of Piezo electric elements 41 and 42 on the first pair of opposite beams is connected to control circuitry 80. The voltage generated by the first pair of Piezo electric elements 41 and 42 in response to the mechanical deformation caused by the second pair of Piezo electric elements 51 and 52 is used by control circuitry 80 to detect the amplitude and timing of the mechanical movement of the core along the X-axis. Control circuitry 80 is also capable of altering the voltage signal applied to the second pair of Piezo electric elements 51 and 52 in response to a signal from one or both of the first pair of Piezo electric elements 41 and 42 to maintain the oscillations without distortion (i.e., at a desired frequency and/or amplitude).

The third pair of Piezo electric (sensing) elements 61 and 62 on the second pair of opposite beams is connected to detection circuitry 90. The first pair of Piezo electric (sensing) elements 41 and 42 on the first pair of opposite beams are also connected to detection circuitry 90. The voltage signal generated by the third pair of Piezo electric elements 61 and 62 include signal components from the Coriolis acceleration caused by rotation of the gyro in the plane of the silicon element plus signal components from any unwanted modes of oscillation in the beam and core arrangements. Detection circuitry 90 compares the signals received from the third pair of Piezo electric elements 61 and 62 with the signals from the first pair of Piezo electric elements 41 and 42.

It will be appreciated that the manufacturing process will typically result in minute variations in the mechanical parameters of the core and the beam arrangement. These variations will likely lead to an imbalance in the arrangement which may cause the mechanical oscillations to be along an axis not perfectly aligned with the intended axis (i.e., x-axis 17). Such off-axis oscillations (i.e., having a y-component) result in a mechanical strain in the second pair of opposite beams. In such a case, a signal is generated by the third pair of Piezo electric elements 61 and 62 integrated therein. This undesired signal differs in phase and amplitude from the desired signal generated in response to the Coriolis acceleration and is present even when the gyro is stationary. The desired signal is extracted by control and error correction circuitry 90 by comparison of the phases of the signals received from the third pair of Piezo electric elements 61 and 62 and the first pair of Piezo electric elements 41 and 42 and by determining that portion of the signal whose phase changes with time. In one embodiment, the undesired signal is eliminated by subtracting the undesired component determined by detection circuitry 90.

In another embodiment, control and error correction circuit 80 determines a corrective signal that is applied to the fourth pair of Piezo electric (driving) elements 71 and 72 on the second pair of opposite beams such as to inject a mechanical force into the second pair of beams to reduce the magnitude of unwanted signals by reducing the unwanted oscillations. The combination of the signals received from the first and third pairs of Piezo elements with the compensation signals applied to the second and fourth pairs of Piezo elements is preferably a feedback circuit arrangement such that a compensating signal is generated in response to unwanted signals so as to reduce the unwanted signals towards zero.

The mechanical arrangement of the mass and the pairs of beams is preferably rotationally symmetrical in 90 degree steps. According to a further embodiment, the functions of the first and third pairs of Piezo electric elements and the functions of the second and fourth pairs of Piezo electric elements can be exchanged electrically by simple switches within the control and error circuit 80. When the device operated in a first connection arrangement with the oscillation of the mass along the X-axis 17, control variables are determined by the control and error correction circuit 80 for correct operation. These control variables are recorded in a memory, such as a non-volatile digital memory coupled to control circuit 80. At a suitable time the connections are switched such that the mass oscillates along the Y-axis, and a new set of control variables is obtained and recorded. From these two sets of recorded control parameters the control and error correction circuit 80 is able to detect possible degradation in performance of one or more of the Piezo elements and take suitable action. Suitable action includes signaling a fault to an external control unit via an output or adjusting the output signal amplitude to compensate for the determined degradation.

By integrating the micro-machined mechanical elements onto the same integrated circuit device, such as a CMOS silicon integrated circuit, as the frequency and amplitude control circuitry and the detection circuitry necessary for controlling the oscillations and measuring and extracting the signals, a significant reduction in cost can be achieved. By further eliminating the errors caused by off-axis oscillations without the need for mechanical adjustments carried out individually on each gyro, the cost and yield is again significantly improved. Also, in one embodiment, by depositing the piezo electric elements onto the flexible elements (beams) supporting the oscillating mass using silicon processing techniques, compatibility with normal silicon processing techniques is ensured and the bonding between the sensing and driving elements and the flexible elements will typically be better than when using films and adhesives.

It will be appreciated that if the driving signals applied to piezo elements 51 and 52 and/or piezo elements 71 and 72 are in phase, the oscillation of the core mass may not be in the plane of annulus 30, but instead the mass may oscillate in a direction orthogonal to the plane of annulus 30 (e.g., having a Z-component). The resultant voltages derived from Piezo elements 41, 42, 61 and 62 may vary in phase from those described for the case where the oscillation is in the plane of annulus 30, but those proficient in the art will appreciate that the control signal generation, signal extraction and signal processing to determine the desired acceleration are sufficiently similar to require no further explanation.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. For example, although two driving elements are shown and two sensing elements in each beam are shown, only one driving element can be used and only one sensing element in each beam can be used. Additionally, the processing of the signals can be implemented using well-known analog or digital techniques, such as by using an analog-to-digital converter with an output coupled to a microprocessor and/or a non-volatile digital memory device. Therefore, the scope of the appended claims should be accorded the broadest interpretation so as to encompass all such modifications and similar arrangements.

What is claimed is:

1. A micro-machined gyro sensor capable of measuring an externally imposed velocity comprising:

a mass coupled to a rigid annular support by a first pair of opposing flexible members and a second pair of opposing flexible members, wherein the first pair of members define a first axis, and wherein the second pair of members define a second axis substantially orthogonal to the first axis;

a first pair of piezo electric driving elements deposited on the first pair of members;

a first piezo electric sensing element deposited on one of the first pair of members, wherein the first sensing element generates a first signal proportional to the oscillation of the mass along the first axis;

a second pair of piezo electric driving elements deposited on the second pair of members;

a second piezo electric sensing element deposited on one of the second pair of members, wherein the second sensing element generates a second signal proportional to the oscillation of the mass along the second axis;

a control circuit coupled to the first and second sensing elements and to the first pair of driving elements, wherein the control circuit generates a control signal which when applied to the first pair of driving elements causes the mass to oscillate along the first axis; and a detection circuit coupled to the first and second sensing elements, wherein the detection circuit receives the first and second signals and generates an output signal proportional to the imposed velocity;

wherein the control circuit receives the first and second signals and generates a signal proportional to an undesired oscillation of the mass along the second axis so as to compensate for the undesired oscillation along the second axis when applied to the second pair of driving elements.

2. The gyro sensor of claim 1, wherein the detection circuit compares the phases of the first and second signals so as to determine the Coriolis acceleration caused by the imposed velocity.

3. The gyro sensor of claim 1, wherein the detection circuit is capable of determining the undesired oscillations of the mass along the second axis when no external velocity is imposed by comparing the phases of the first and second signals.

4. The gyro sensor of claim 3, wherein the detection circuit compensates for the undesired oscillations by subtracting out the undesired component from the output signal.

5. The gyro sensor of claim 1, wherein each of said piezo electric elements are deposited on the respective beams using silicon processing techniques.

6. The gyro sensor of claim 1, further comprising a third sensing element deposited on a second one of the first pair of members and a fourth sensing element deposited on a second one of the second pair of members, wherein the control circuit is coupled to the third and fourth sensing elements, and wherein the control circuit alters the control signal in response to signals received from the third and fourth sensing elements so as to maintain oscillation of the mass along the first axis at a desired amplitude and frequency.

7. The gyro sensor of claim 1, wherein the gyro sensor is micro-machined into a silicon substrate.

8. The gyro sensor of claim 1, wherein oscillation of the mass includes an oscillation component orthogonal to a plane defined by the first and second axes.

9. The gyro sensor of claim 1, wherein the mass oscillates orthogonal to a plane defined by the first and second axes.

10. A micro-machined gyro sensor capable of measuring an externally imposed velocity comprising:

a mass coupled to a rigid annular support by a first pair of opposing flexible members and a second pair of opposing flexible members, wherein the first pair of members define a first axis, and wherein the second pair of members define a second axis substantially orthogonal to the first axis;

first driving means coupled to the first pair of members for causing the mass to oscillate along the first axis;

second driving means coupled to the second pair of members for causing the mass to oscillate along the second axis;

detection means, coupled to the first pair of members and the second pair of the second pair of members, for detecting and comparing oscillations of the mass along the first axis and along the second axis so as to measure the Coriolis acceleration caused by the imposed velocity;

a first sensing means, deposited on one of the first pair of members, for generating a first signal proportional to the oscillation of the mass along the first axis;

a second sensing means, deposited on one of the second pair of members, for generating a second signal proportional to the oscillation of the mass along the second axis; and a control means is coupled to the first and second sensing means and the first and second driving means and includes a means for comparing the first and second signals to determine an undesired oscillation of the mass along the second axis and for generating signals so as to compensate for the undesired oscillation when applied to the first and second driving means.

11. The gyro sensor of claim 10, wherein the detection means is capable of determining undesired oscillations of the mass along the second axis when no external velocity is imposed by comparing the phases of the first and second signals, and wherein the detection means compensates for the undesired oscillations by subtracting out the undesired component from the output signal.

12. The gyro sensor of claim 10, wherein each of the first and second driving means includes a pair of driving elements deposited on the respective pair of members.

13. The gyro sensor of claim 10, wherein the mass is able to oscillate orthogonal to a plane defined by the first and second axes.

14. A micro-machined gyro sensor capable of measuring an externally imposed velocity, comprising:

a mass coupled to a rigid annular support by a first pair of opposing flexible members and a second pair of opposing flexible members, wherein the first pair of members define a first axis, and wherein the second pair of members define a second axis substantially orthogonal to the first axis;

a first pair of piezo electric driving elements deposited on the first pair of members;

a first pair of piezo electric sensing elements deposited on the first pair of members, wherein the first pair of sensing elements generates first signals proportional to the oscillation of the mass along the first axis;

a second pair of piezo electric driving elements deposited on the second pair of members;

a second pair of piezo electric sensing elements deposited on the second pair of members, wherein the second pair of sensing elements generates second signals proportional to the oscillation of the mass along the second axis;

a control circuit coupled to at least one of each of the first and second pairs of sensing elements and to the first pair of driving elements, wherein the control circuit generates a control signal which when applied to the first pair of driving elements causes the mass to oscillate along the first axis; and a detection circuit coupled to the first and second pairs of sensing elements, wherein the detection circuit receives the first and second signals and generates an output signal proportional to the imposed velocity;

wherein the control circuit receives the first and second signals and generates a signal proportional to an undesired oscillation of the mass along the second axis so as to compensate for the undesired oscillation along the second axis when applied to the second pair of driving elements.

15. A micro-machined gyro sensor capable of measuring an externally imposed velocity, comprising:

a mass coupled to a rigid annular support by a first pair of opposing flexible members and a second pair of opposing flexible members, wherein the first pair of members define a first axis, and wherein the second pair of members define a second axis substantially orthogonal to the first axis;

first driving means coupled to the first pair of members for causing the mass to oscillate along the first axis;

second driving means coupled to the second pair of members for causing the mass to oscillate along the second axis;

detection means, coupled to one of the first pair of members and the second pair of members, for detecting oscillations of the mass along the first axis and along the second axis so as to measure the Coriolis acceleration caused by the imposed velocity;

a first sensing means, deposited on one of the first pair of members, for generating a first signal proportional to the oscillation of the mass along the first axis;

a second sensing means, deposited on one of the second pair of members, for generating a second signal proportional to the oscillation of the mass along the second axis; and a control means is coupled to the first and second sensing means and the first and second driving means and includes a means for comparing the first and second signals to determine an undesired oscillation of the mass along the second axis and for generating signals so as to compensate for the undesired oscillation when applied to the first and second driving means.

* * * * *